(12) United States Patent
Dorigoni

(10) Patent No.: US 9,295,199 B2
(45) Date of Patent: Mar. 29, 2016

(54) CUTTING EQUIPMENT FOR PLANT ROWS

(71) Applicant: FONDAZIONE EDMUND MACH, San Michele All'Adige (IT)

(72) Inventor: Alberto Dorigoni, Trento (IT)

(73) Assignee: Fondazione Edmund Mach, San Michele All'Adige (TN) (IT)

( * ) Notice: Subject to any disclaimer, the term of this patent is extended or adjusted under 35 U.S.C. 154(b) by 0 days.

(21) Appl. No.: 14/372,176

(22) PCT Filed: Jan. 8, 2013

(86) PCT No.: PCT/IB2013/000021
§ 371 (c)(1),
(2) Date: Jul. 14, 2014

(87) PCT Pub. No.: WO2013/104973
PCT Pub. Date: Jul. 18, 2013

(65) Prior Publication Data
US 2014/0345243 A1    Nov. 27, 2014

(30) Foreign Application Priority Data
Jan. 13, 2012   (IT) ............................... VI2012A0010

(51) Int. Cl.
*A01G 3/04*     (2006.01)

(52) U.S. Cl.
CPC ............ *A01G 3/0417* (2013.01); *A01G 3/0426* (2013.01)

(58) Field of Classification Search
CPC . A01D 34/866; A01G 3/0435; A01G 3/0426; A01G 3/08; A01G 3/0408; A01G 3/0417; A01G 17/02
USPC .................................. 56/15.2, 233–237; 47/4
See application file for complete search history.

(56) References Cited

U.S. PATENT DOCUMENTS

| 4,302,922 | A |   | 12/1981 | Guerndt, Jr. et al. |
|-----------|---|---|---------|---------------------|
| 4,355,497 | A |   | 10/1982 | Murphy              |
| 5,544,444 | A | * | 8/1996  | Oldridge .............................. 47/4 |
| 6,085,505 | A | * | 7/2000  | Edwards .......................... 56/15.2 |
| 6,523,337 | B2 | * | 2/2003 | Spagnolo .......................... 56/234 |
| 8,490,372 | B2 | * | 7/2013 | Paquette ........................... 56/237 |
| 2011/0308215 | A1 |   | 12/2011 | Paquette |

FOREIGN PATENT DOCUMENTS

DE           34 02 801 A1     8/1985

OTHER PUBLICATIONS

International Search Report and Written Opinion dated Mar. 28, 2013, issued in PCT Application No. PCT/IB2013/000021, filed Jan. 8, 2013.

* cited by examiner

*Primary Examiner* — Robert Pezzuto
(74) *Attorney, Agent, or Firm* — Workman Nydegger

(57) ABSTRACT

A pruning system (1; 20) for planting rows (F) includes a frame (2) suited to support a pruning assembly (3; 30). The pruning assembly (3; 30) includes a first pruning assembly (3) in which it is possible to identify a plurality of cutting units (4) that are independent of and spaced from one another, the cutting units (4) being mechanically associated with the frame (2) through a plurality of first supporting rods (6) suited to allow the movement of the cutting units (4) according to an orthogonal direction with respect to the alignment direction of the planting rows (F). The supporting frame (2) can be associated with structure (7) for moving the frame (2) and the pruning assembly (3; 30) that are suited to make the pruning assembly (3; 30) assume different operating positions according to a parallel direction with respect to the alignment direction of the planting rows (F).

14 Claims, 6 Drawing Sheets

CUTTING EQUIPMENT FOR PLANT ROWS

BACKGROUND OF THE INVENTION

1. Field of the Invention

The present invention concerns a pruning system for rows of fruit trees.

As is known, traditional mechanical pruning (using single-layer pruning machines) was introduced in Italy in the Seventies to facilitate manual pruning operations, which at that time required more than 200 hours per hectare.

2. Present State of the Art

Mechanical pruning was carried out with different types of machinery (with cutter bar, with double or single blade, with knives, disks, etc.) mounted in front of a tractor and required approximately 10-20 hours per hectare.

The single-layer pruning machines used at present make it possible to vary the inclination of the vertical cutting plane from 0 to approximately 15 degrees. In this way, the upper portion of the trees is narrower (approximately 80 cm) and this allows the lower portion of the planting row, which is wider at the base (approximately 110 cm), to receive more light.

In modern fruit plantations the vertical cutting operation and the cutting of the row tops (horizontal cutting) requires only 3 hours per hectare at a speed of 2 km/h. In this way a very narrow row wall is obtained, which is called "fruit-bearing wall" and offers the following advantages:

- better exposure of fruits to light;
- 30-40% reduction in manual pruning times;
- elimination of plant growth regulators (PGRs), the plant hormones used to keep the plant branches shorter;
- improved access to the fruit trees with any type of machinery and simplification of cultivation operations (branch bending, manual thinning of branches, fruit picking);
- reduction in the volumes of water necessary for phytosanitary treatments.

With the single-layer pruning machines used at present, the cutting operation is carried out along the planting row, substantially on two dimensions, height and length.

Consequently, said pruning machines do not get into the vegetation of the planting row but remain on the surface of the same, at a distance of approximately 50-70 cm from the trunk, forming a single cutting plane near the vertical axis, if necessary associated with a horizontal cutting plane at the level of the tree tops and with a further cutting plane at approximately 50 cm from the ground.

The only degrees of freedom of said pruning machines are represented by the distance from the trunk and the inclination of the vertical cutting plane.

Consequently, the cutting operation performed by said pruning machines creates a sort of "hedge" in the shape of a frustum of pyramid, which requires a manual finishing operation consisting in the elimination of the excess wood present inside the plant.

Consequently, a planting row with very limited thickness, preferably less than 1 metre, is obtained, which forms a sort of "fruit-bearing wall".

"Multilevel cutting" (Van de Vrie, 1973), instead, produces a cut close to the horizontal plane, starting from the outside and getting into the plant, but it is suitable for vigorous trees with rising branches, typical of forms of cultivation that are not used any longer in modern systems.

This type of cutting operation, however, is carried out with several passes and therefore becomes a complex operation that requires a certain amount of time.

Another prior are document is the patent application DE-A-3402801, which disclose a movable hedge-cutting device supported by a rod suited to be moved in orthogonal direction with respect to the direction of the plant row.

A further prior art document is the patent application US-A-4355497, which discloses an apparatus for the trimming trees including a self-levelling cutter supporting frame and a number of knive-like cutting blades mounted on the frame for rotation at high speed.

SUMMARY OF THE INVENTION

The object of the present invention is to eliminate the drawbacks described above.

In particular, the main object of the present invention is to provide a pruning system for planting rows that is capable of performing a vertical and discontinuous cut, that is, capable of getting into the vegetation of the planting row.

It is a further object of the present invention to provide a pruning system for planting rows that makes it possible to avoid the manual operation of elimination of the excess wood present inside the plant.

It is a further object of the present invention to provide a pruning system that allows the cut to be carried out both inside and outside the planting rows, avoiding several passes.

It is another yet not the least object of the present invention to provide a pruning system that induces the cyclical renewal of the fruit-bearing branches of the planting rows.

The objects listed above are achieved by the present invention concerning a pruning system for planting rows whose main characteristics are in compliance with the contents of the independent claim.

Further characteristics of the invention are the subject of the dependent claims.

Advantageously, the pruning system according to the present invention is provided with a first cutting unit comprising a plurality of cutting units that make an internal discontinuous cut opening some "lighting windows" towards the inside of the tree tops of the planting row.

Still advantageously, the pruning system according to the present invention allows the height of the cutting units to be adjusted, thus making it possible to alternate, over the years, the position of the "windows" towards the inner part of the planting row.

Still advantageously, the pruning system according to the invention makes it possible to carry out the different cutting operations on the planting row with a single pass, once the fruit grower has set the various cutting parameters.

Again to advantage, according to a variant embodiment of the invention, the pruning system operates on two cutting planes (external and internal) that are independent of each other and therefore it is possible to decide the external and the internal cutting angle independently, according to the type of fruit plantation to be pruned.

For example, in a very thick fruit plantation the external cutting inclination can be set at 12 degrees and the internal cutting inclination can be set at 5 degrees, in order to obtain protruding portions of 5 cm at the top and of 30-40 cm at the base, so as to favour the proliferation of buds at the bottom, which receives less light. On the other hand, in a thin fruit plantation the angle of the external blade can be of 5 degrees and the supporting rods of the internal blades can be vertical (=0 degrees of inclination).

Still advantageously, in a fruit plantation that when pruned with traditional pruning equipment requires 100 hours, the pruning system according to the present invention ensures a labour saving of 50 to 80 hours.

BRIEF DESCRIPTION IF THE DRAWING

The above mentioned objects and advantages of the invention are illustrated in greater detail in the following description, which is provided by way of non-limiting example, with reference to the attached drawings, wherein.

Figure 7:
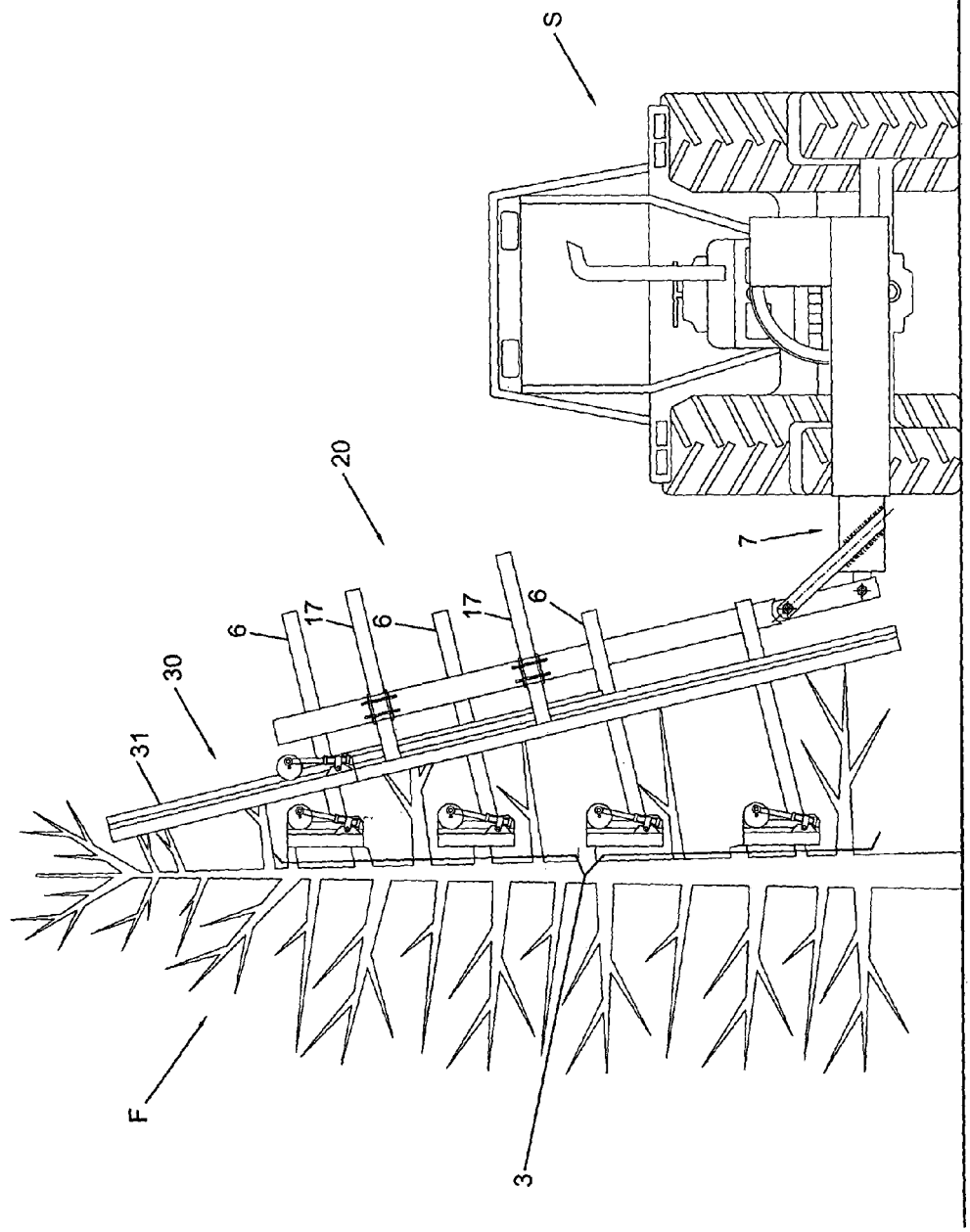
FIG. 7 shows a front view of a variant embodiment of the pruning system of FIG. 1 performing a discontinuous cut inside and a continuous cut outside the planting row.
Figure 8:
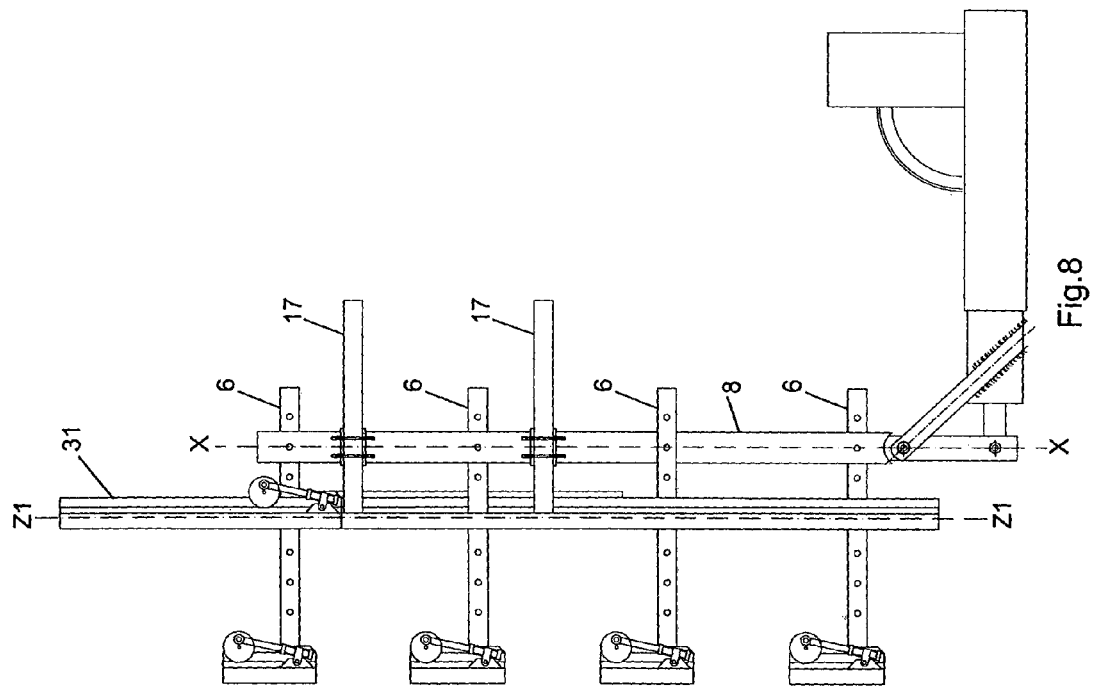
Figure 9:
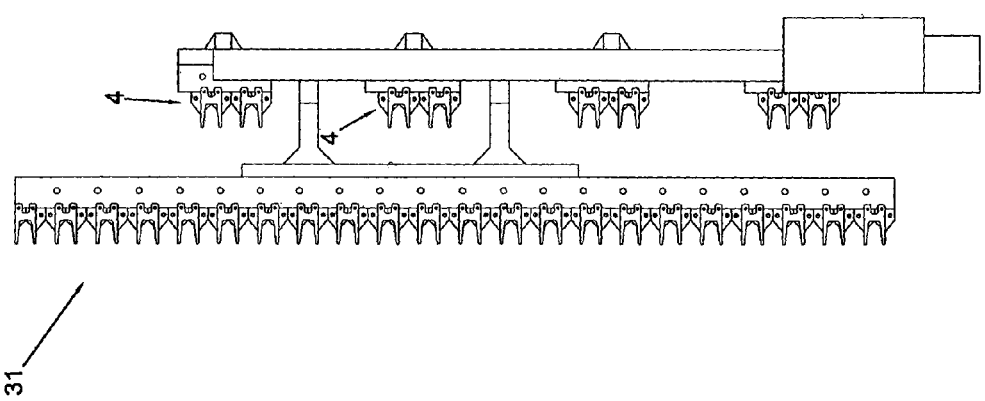
Figure 11:
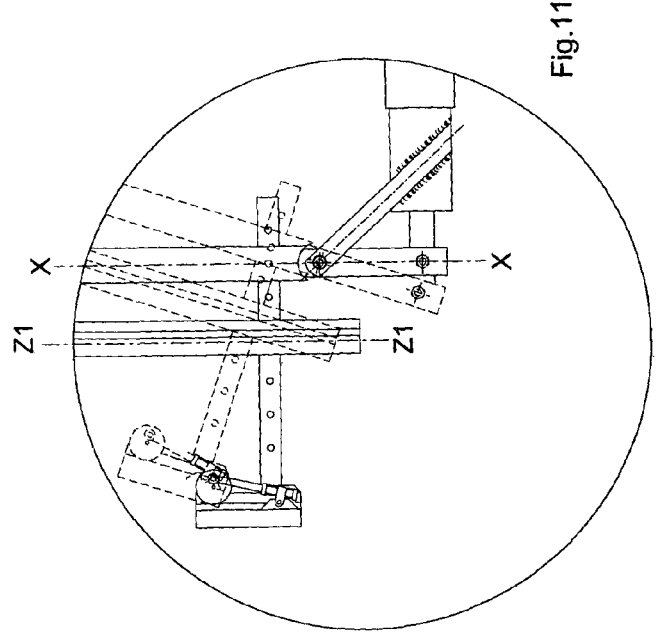
Figure 10:
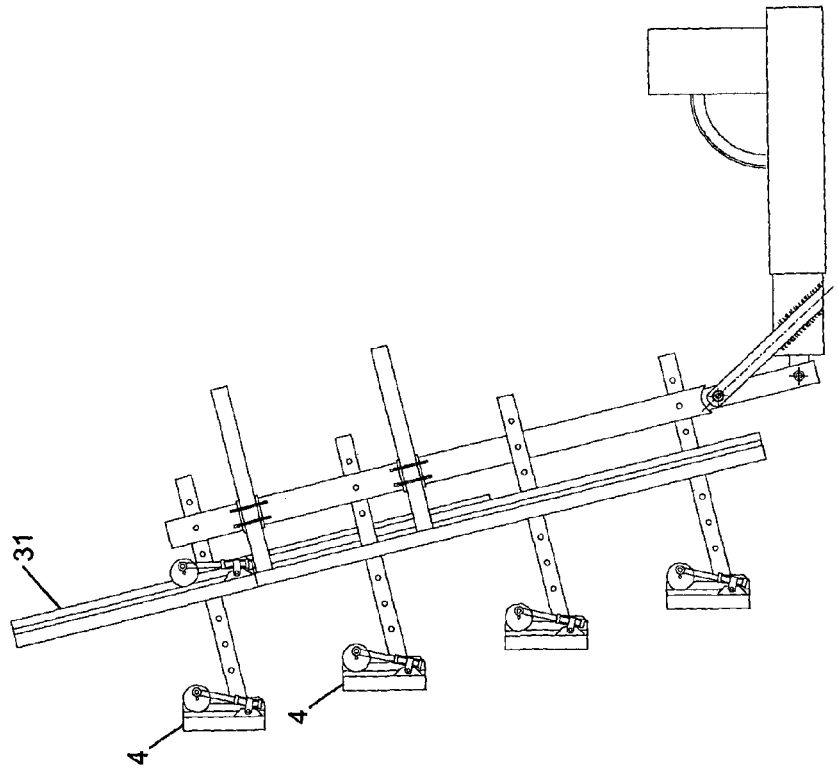

FIGS. 8 and 9 respectively show a front view and a view of the cutting plane of a detail of FIG. 7;

FIG. 10 shows a front view of a different operating configuration of the detail of FIG. 8 with two different independent inclinations of the internal and external cutting planes;

FIG. 11 shows a front view of a different operating configuration of the detail shown in FIG. 8.

DETAILED DESCRIPTION OF THE PREFERRED EMBODIMENTS

Figure 1:
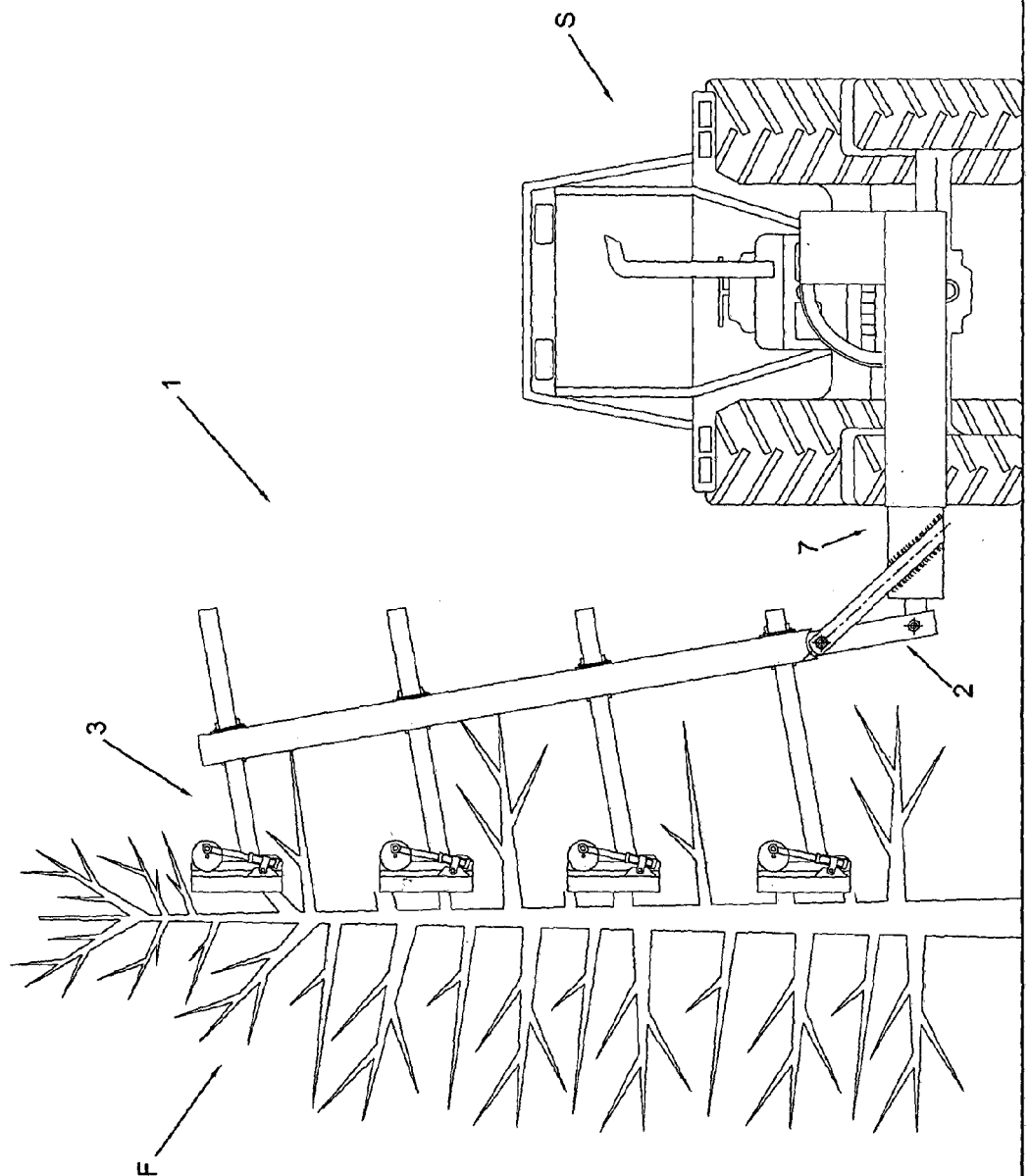
FIG. 1 shows a front view of the pruning equipment according to the invention, which carries out a discontinuous cut inside the plant, mounted on a self-propelled vehicle.

With reference to FIG. 1, it can be observed that the pruning system for planting rows that is the subject of the invention, indicated as a whole by 1, comprises a supporting frame 2 for a pruning assembly.

According to the present invention, the pruning assembly comprises a first pruning assembly 3 in which it is possible to identify a plurality of cutting units 4 that are independent of and spaced from one another, said cutting units 4 being mechanically associated with the frame 2 through a plurality of first supporting rods 6 that allow the cutting units 4 to be moved according to a direction that is substantially parallel to the alignment direction of the planting rows.

Always according to the invention, the supporting frame can be associated with means 7 for moving the frame 2 and the first pruning assembly 3 that are suited to make the first pruning assembly 3 assume different operating positions according to a direction substantially parallel to the planting row alignment direction.

Figure 2:
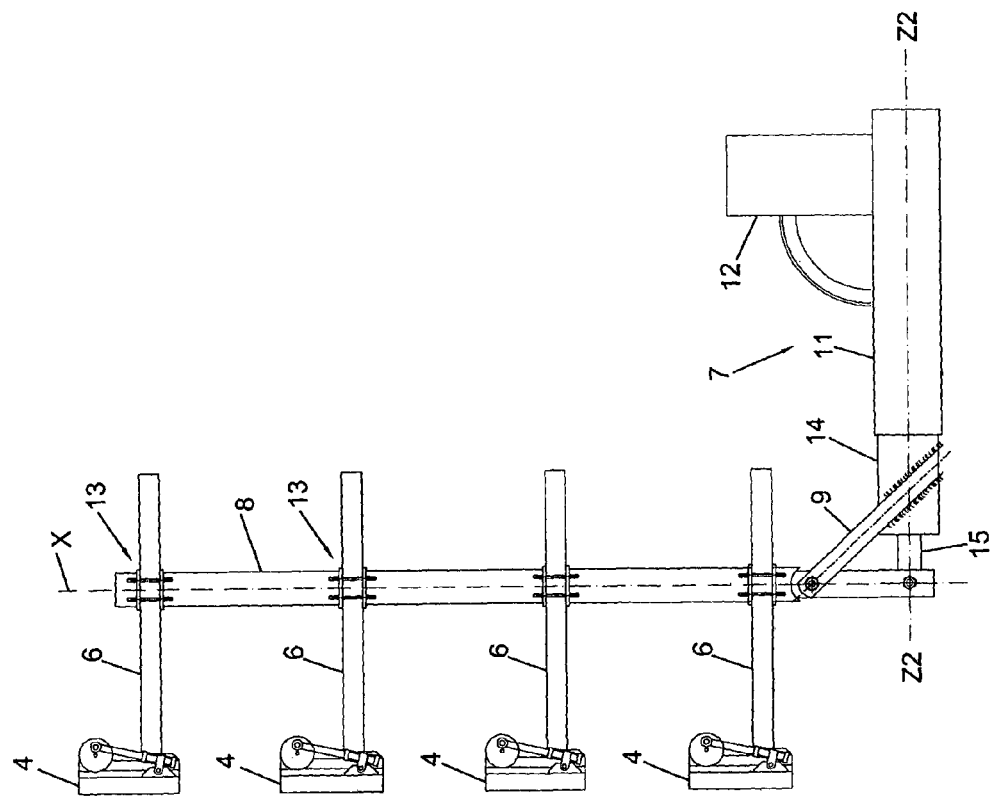
FIG. 2 shows a front view of a detail of FIG. 1.
Figure 3:
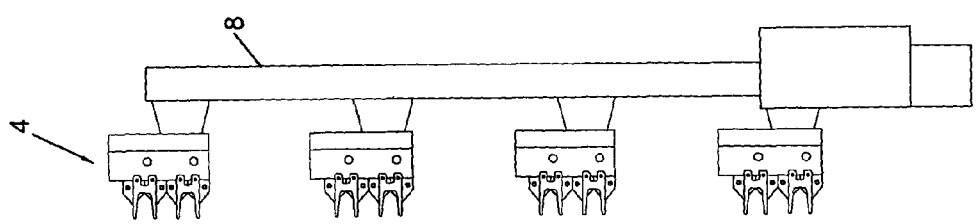
FIG. 3 shows a view of the detail of the cutting system shown in FIG. 2.

In particular, and with reference to FIG. 2, the supporting frame 2 comprises a beam 8 that is connected at one end with the moving means 7 through a pin 10 that allows it to rotate with respect to the longitudinal axis X of the beam 8. The amplitude of the rotation with respect to the vertical axis is generally 15°.

As can be observed, always in FIG. 2, each cutting unit 4 is fixed to the beam 8 through U bolts 13.

Obviously, according to possible variant embodiments not illustrated in the figures, the fixing means can be of another type, for example angular elements or brackets or the like.

It is also evident that in variant embodiments not illustrated in the figures the type of blade of each cutting unit 4 can be different from the one provided in the embodiments illustrated herein. For example, it is possible to use a disk saw, a shearing blade, a double blade, rotary knives etc.

Figure 4:
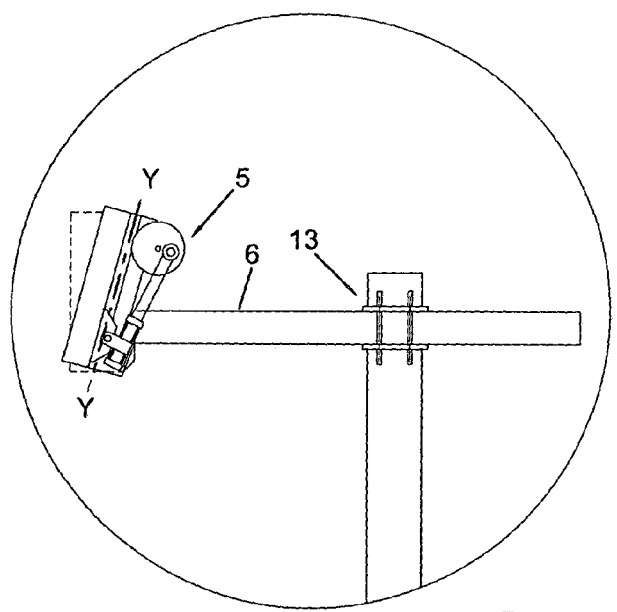
FIG. 4 shows a view of the detail of a cutting unit of FIG. 2 in an operating configuration.
Figure 5:
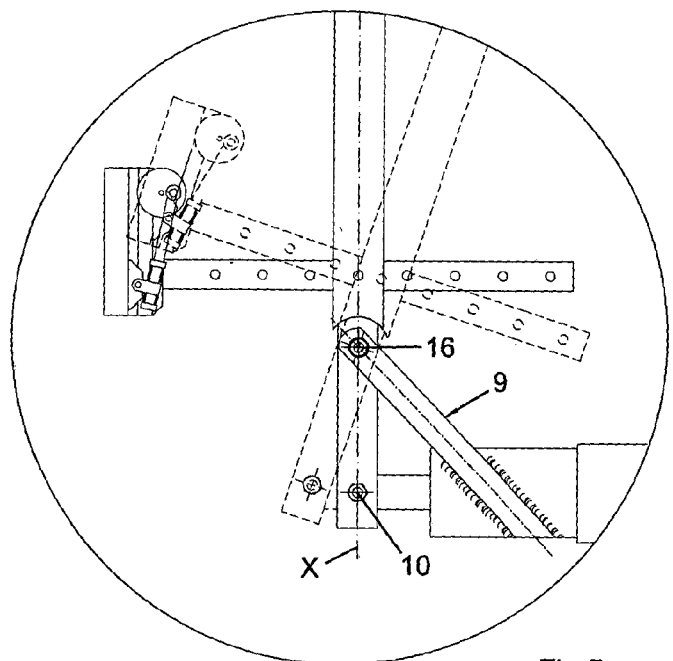
FIG. 5 shows a view of a different detail of FIG. 2.

With reference to FIGS. 4 and 5, it can be noted that it is possible to adjust the distance of the cutting units 4 from the planting row F by manually adjusting each one of the first supporting rods 6 with respect to the longitudinal axis X of the beam 8, finally fixing it to the beam 8 by means of the U bolts 13.

With reference in particular to FIG. 4, each cutting unit 4 can be rotated around its longitudinal axis Y.

With reference to FIG. 5, it can be noted that the beam 8 is connected to the moving means 7 through an arm 9.

The arm 9 is connected at one end to the beam 8 through a pin 16 and at the opposite end it is welded to the moving means 7 of the pruning system 1.

Figure 6:
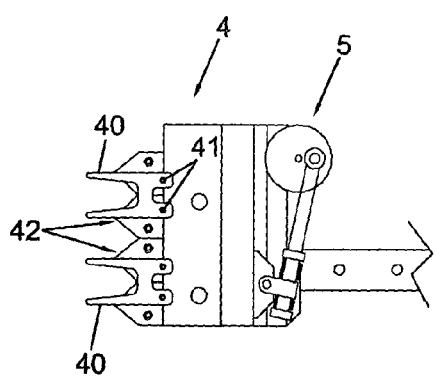
FIG. 6 shows a view of a detail of FIG. 3.

With reference to the detail shown in FIG. 6, it can be observed that each cutting unit 4 comprises a fixed blade 40, constrained with screws 41, and a movable blade 42.

In particular, it can be noted that the fixed blade 40 and the movable blade 42 interact with each other and the latter performs an alternate rectilinear vertical movement and is moved through a connecting rod-crank kinematic mechanism 5 operated by a motor (not shown in the figure).

With reference to FIGS. 1 and 2, the moving means 7 comprise a first hollow shaped body 11 connected laterally to a second shaped body 12, which is successively connected to the front of a self-propelled vehicle S (visible in FIG. 1) according to the known art.

In particular, the moving means 7 also comprise a first hydraulic piston 14 that slides inside the first shaped body and a second hydraulic piston 15 that slides inside the first piston 14 and is connected to the opposite end through the pin 10.

The sliding movement of the first and of the second piston, respectively 14 and 15, takes place along a longitudinal axis Z2 that is common to them and to the first shaped body 11, visible in FIG. 2.

FIG. 7 shows a variant embodiment of the pruning system according to the invention, now indicated as a whole by 20, which differs from the previous embodiment due to the fact that it now comprises two pruning assemblies, respectively 3 and 30.

The second pruning assembly 30 comprises a single cutting unit 31 that makes the external continuous cut and is connected to the beam 8 through the U bolts 13.

With reference to FIG. 8, it should be noted that the connection of the beam 8 to the cutting units 4 is obtained through the first supporting rods 6 that are constrained to one side of the beam 8 through the U bolts 13, while the single cutting unit 31, constituted by a blade with mainly longitudinal development, is connected to the opposite side of the beam 8 through second supporting rods 17 constrained with the U bolts 13.

The single cutting unit 31 has a longitudinal axis Z1 that is spaced from and substantially parallel to the longitudinal axis X of the beam 8.

The first pruning assembly 3 allows a discontinuous internal cut to be made in the planting row by opening suitable "windows", while the second pruning assembly 30 allows the external surface of the planting row F to be cut according to the known art.

The self-propelled vehicle S used for moving the pruning system 1 or 20, visible in FIGS. 1 and 7, is of the type known per se and is generally constituted by a tractor, but it can also be a different self-propelled means that performs analogous functions.

In practice, and with reference to figures from 1 to 6, the pruning system 1 is mounted at the front of the tractor S, which moves parallel to the alignment direction of the planting row.

The first supporting rods 6 and the inclination of the individual cutting units are successively adjusted manually by setting the inclination value in degrees.

At this point the operator uses the moving unit to bring the pruning system 1 close to the planting row F in order to maintain the selected distance, according to a direction orthogonal to the alignment direction of the planting row F.

Successively, the beam 8 that supports the cutting unit 4 is rotated until reaching the desired amplitude in order to start making the discontinuous cut inside the planting row F.

In practice and with reference to Figures from 7 to 11, concerning the variant embodiment of the system 20 shown in FIG. 7, the process is analogous to that illustrated for the pruning system 1. In this case, the beam 8 that supports the cutting units 4 and the single cutting unit 31 approaches orthogonally the direction of alignment of the planting row F and then the cutting units 4 and the unit 31 are rotated, after setting the respective inclinations as desired.

The single cutting unit 31 cuts the external surface of the planting row F according to a substantially orthogonal plane or, however, a plane that is incident on the ground, while the cutting units 4 cut the inside of the planting row F according to a plane that is also substantially orthogonal with respect to the ground. The two cutting planes are independent of each other, with inclination differences in ranging from 0 (parallel planes) to approximately 20 degrees.

According to the above, it can be understood that the pruning system according to the invention operates on two substantially parallel planes and therefore is also called "double-layer pruning machine".

The flexibility of use of the pruning system according to the invention allows most of the drawbacks of traditional single-layer pruning machine to be overcome.

The cutting operation on the top of the planting row is not modified by the double-layer pruning machine but as regards the pruning of the wall of the planting row, instead, the introduction of a second discontinuous, cutting plane that opens "lighting windows" makes it possible to pass from two-dimensional pruning (that is, a pruning operation that develops over the height and along the direction of alignment of the planting rows) to three-dimensional pruning (that is, a pruning operation that develops over the height, along the direction of alignment of the planting rows and in depth with respect to the external surface of the planting row).

In this way, the pruning system according to the invention can operate also in relatively voluminous fruit plantations with no need to create a very narrow wall.

According to the above, the pruning system achieves all the set objects.

The pruning system according to the invention allows the operator to decide the number of cutting units to be used and thus the number of "windows" to be opened in the planting row, according to the needs. It is also possible to cut only a part of the planting row, for example only the top.

There is also the possibility to decide in advance the number of cutting units, the inclination of the supporting frame, the adjustment of the supporting rods, the rotation of the cutting units. Following this pre-setting stage, all the cutting operations are carried out with a single pass.

All the variants mentioned above make up a very wide group of combinations that can be set by the fruit grower depending on the plant, the type of system and the object to be achieved.

Consequently, production can be planned and assigned to a population of branches of known age and planned according to the type of plant, the variety and the quality standards required.

In the construction stage, the pruning system according to the invention can be subjected to modifications and/or variants which must all be considered protected by the present patent, provided that they fall within the scope of the claims expressed below.

The invention claimed is:

1. A pruning system for planting rows, comprising:
a frame suited to support at least one pruning assembly, said at least one pruning assembly comprising:
a first pruning assembly comprising a plurality of cutting units that are independent of and spaced from one another and a plurality of first support rods projecting from said frame at spaced apart locations along a length of said frame, each of said plurality of cutting units being disposed on a corresponding one of said plurality of first support rods so that when said frame is in a raised position for pruning, said plurality of cutting units are vertically spaced apart, said plurality of first supporting rods allowing said cutting units to be moved according to a substantially orthogonal direction with respect to an alignment direction of said planting rows,
wherein said supporting frame is associated with means for moving said frame and said at least one pruning assembly that are suited to make said pruning assembly assume different operating positions according to a substantially parallel direction with respect to an alignment direction of said planting rows.

2. The pruning system according to claim 1, wherein said supporting frame comprises a beam connected to said moving means through a pin that allows said frame to rotate around a longitudinal axis of said pin.

3. The pruning system according to claim 1, wherein each of said first supporting rods can be adjusted to outwardly project at different distances from said supporting frame.

4. The pruning system according to claim 1, wherein each of said first supporting rods are connected to said supporting frame through one or more U bolts.

5. The pruning system according to claim 1, wherein each one of said cutting units comprises a fixed blade and a movable blade interacting with each other, wherein said movable blade moves with an alternate rectilinear motion through a connecting rod-crank kinematic mechanism.

6. The pruning system according to claim 1, wherein said cutting units can be rotated with respect to a longitudinal axis of said cutting units.

7. The pruning system according to claim 1, wherein said at least one pruning assembly comprises also a second pruning assembly comprising a single cutting unit mechanically connected to said supporting frame through a plurality of second supporting rods.

8. The pruning system according to claim 7, wherein said single cutting unit of said second pruning assembly develops mainly according to a longitudinal direction and has a longitudinal axis of said single cutting unit, said longitudinal axis being substantially parallel and spaced with respect to a longitudinal axis of a beam which is comprised in said supporting frame and which is connected to said moving means through a pin that allows said frame to rotate around a longitudinal axis of said pin.

9. The pruning system according to claim 1, wherein said moving means comprise a first hollow shaped body, a first piston and a second piston, said first piston sliding inside said first shaped body and said second piston sliding inside said first piston and interacting with said supporting frame.

10. The pruning system according to claim 9, wherein said first piston, said second piston and said first shaped body are aligned according to a common longitudinal axis.

11. A pruning system for planting rows, comprising:
- an elongated brace having an upper end and an opposing lower end;
- a plurality of first support rods outwardly projecting from the elongated brace at spaced apart locations along a length of the brace;
- a cutting unit disposed on each first support rod, each cutting unit being rotatable relative to the support rod on which it is disposed; and
- a moving assembly comprising a movable first piston having the lower end of the brace rotatably coupled thereto.

12. The pruning system according to claim 11, wherein each first support rod is adjustably mounted to the brace so that each support rod can be adjusted to outwardly project at different distances from the brace.

13. The pruning system according to claim 11, wherein the moving assembly further comprises:
- a body;
- a second piston movable relative to the body; and
- an arm having a first end with the brace rotatably secured thereto and an opposing second end secured to the second piston, the first piston being movably disposed on the second piston.

14. The pruning system according to claim 11, further comprising:
- a plurality of second support rods outwardly projecting from the elongated brace at spaced apart locations along the brace; and
- an elongated cutting unit supported by each of the plurality of second support rods.

* * * * *